United States Patent
Kondo et al.

(10) Patent No.: US 8,720,901 B2
(45) Date of Patent: May 13, 2014

(54) SEAL RING

(75) Inventors: Yosuke Kondo, Nihonmatsu (JP); Iwao Taira, Nihonmatsu (JP); Kazunari Seki, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 313 days.

(21) Appl. No.: 12/525,206

(22) PCT Filed: Feb. 1, 2008

(86) PCT No.: PCT/JP2008/051683
§ 371 (c)(1),
(2), (4) Date: Jul. 30, 2009

(87) PCT Pub. No.: WO2008/093849
PCT Pub. Date: Aug. 7, 2008

(65) Prior Publication Data
US 2009/0322037 A1 Dec. 31, 2009

(30) Foreign Application Priority Data

Feb. 1, 2007 (JP) .................... 2007-023396

(51) Int. Cl.
*F02F 5/00* (2006.01)
*F16J 9/14* (2006.01)
*F16J 15/02* (2006.01)

(52) U.S. Cl.
USPC ............................ 277/496; 277/497; 277/631

(58) Field of Classification Search
USPC ................................. 277/496–499
See application file for complete search history.

(56) References Cited

U.S. PATENT DOCUMENTS

| | | | | |
|---|---|---|---|---|
| 1,357,729 A | * | 11/1920 | Schaap | 277/447 |
| 1,369,104 A | * | 2/1921 | Hendrickson | 277/497 |
| 1,381,668 A | * | 6/1921 | Schaap | 277/497 |
| 1,428,654 A | * | 9/1922 | Norman | 277/497 |
| 1,563,566 A | | 12/1925 | Grover | |
| 2,860,019 A | * | 11/1958 | Osmun | 277/449 |
| 4,449,721 A | | 5/1984 | Tsuge | |
| 6,715,767 B1 | * | 4/2004 | Meernik et al. | 277/459 |

FOREIGN PATENT DOCUMENTS

DE  3149455 A1  8/1982

(Continued)

OTHER PUBLICATIONS

Extended European Search Report for European Patent Application No. 08710715.7, dated Jun. 1, 2012.

*Primary Examiner* — Vishal Patel
*Assistant Examiner* — Nicholas L Foster
(74) *Attorney, Agent, or Firm* — Harness, Dickey & Pierce, P.L.C.

(57) ABSTRACT

A seal ring that seals an annular gap formed between a shaft and a housing that has a shaft hole into which the shaft is inserted. The seal ring is configured such that one of both the ends and has a projection projecting in the direction of the circumference of the seal ring. The other end has a recess used in combination with the projection. The seal ring is characterized in that the recess has an inclining side face, which inclines from the direction of the circumference, and the projection and the recess form a sliding part so that a part of the edge of the leading end of the projection slides over the inclining side face of the recess, and portion of the sliding part is formed as a linear sliding portion.

1 Claim, 15 Drawing Sheets

(56) References Cited

FOREIGN PATENT DOCUMENTS

| JP | 57-104052 U | 6/1982 |
| JP | 60037458 A | 2/1985 |
| JP | 08-326923 A | 12/1996 |
| JP | 09-004723 A | 1/1997 |
| JP | 10-082466 A | 3/1998 |
| JP | 11-294595 | * 10/1999 |

* cited by examiner

FIG. 8

| X(mm) | 0.00 | 0.01 | 0.05 | 0.10 |
|---|---|---|---|---|
| RESILIENCY | × | ○ | ○ | ○ |
| LEAKAGE (cc/min) | 5~20 | 5~20 | 5~25 | 20~150 |

SEAL RING

CROSS-REFERENCE TO RELATED APPLICATIONS

This application is a national stage application of International Application No. PCT/JP2008/051683 filed on Feb. 1, 2008. This application claims the benefit and priority of JP 2007-023396, filed Feb. 1, 2007. The entire disclosures of each of the above applications are incorporated herein by reference.

FIELD

The present disclosure relates to a seal ring that is separated in one area and has a shape with ends.

BACKGROUND

Conventionally, a seal ring 100, as shown in FIG. 10, is known as a device for sealing an annular gap between two members which can rotate freely relative to each other in a hydraulic device or such like. FIG. 10 is a schematic cross-sectional view showing an attached state of the seal ring 100 according to the conventional technique.

The seal ring 100 is a substantially annular member, and seals an annular gap 400 between a housing 200 and a shaft 300 attached in a shaft hole 201 of the housing 200.

The seal ring 100 is attached into an annular groove 301 formed in the shaft 300 and is pressed toward the non-sealed fluid side A by oil pressure P acting from the sealed fluid side O. And then, the periphery 101 comes into close contact with the inner circumferential face of the shaft hole 201 in the housing 200, and the end face 102 on the non-sealed fluid side A comes into close contact with the side wall 302 (on the non-sealed fluid side A) of the annular groove 301 of the shaft 300. This restrains a leakage of oil, such as, lubricating oil from the sealed fluid side O to the non-sealed fluid side A.

Generally, such a seal ring 100 used in a hydraulic device is separated in one area of the circumference and has a shape with ends in order to improve its attachability. As the shape of a separating part S of the seal ring 100, a step cut as shown in FIG. 11 is known. FIG. 11 is a schematic perspective view of the configuration of the separating part S of the seal ring 100 in the conventional technique.

In the separating part S of the seal ring 100, a projection 103 is formed at one end, and a recess 104 is formed at the other end, which is used in combination with the projection 103. The separated ends of separating part S are connected by fitting the projection 103 into the recess 104, thereby forming the annular seal ring 100.

Formed in the fitting area of the separating part S are: sliding seal faces 105a and 105b slidable in the direction of the circumference, which are formed by the contacts between the side faces 103a and 103b of the projection 103 and the side faces 104a and 104b of the recess 104 respectively; and a gap 106 absorbable any change in the length of the circumference of the seal ring, which is formed between the leading-end face 103c of the projection 103 and the deepest part face 104c of the recess 104.

Accordingly, even if the length of the circumference of the seal ring 100 changes due to a temperature change, etc., the side faces 103a and 103b of the projection 103 and the side faces 104a and 104b of the recess 104, respectively, slide against each other in the direction of the circumference. Thereby, the separating part S is stretched or compressed in the direction of the circumference (in the direction of arrow in FIG. 10), thus is able to absorb any change in the length of the circumference of the seal ring 100.

In addition, even if the length of the circumference changes, the contacts between the side faces 103a and 103b of the projection 103 and the side faces 104 and 104b of the recess 104 (i.e., the formation of the sliding seal faces 105a and 105b) are maintained respectively. This prevents such a gap that might allow communication between the sealed fluid side O and the non-sealed fluid side A from being formed in the separating part S.

Such a seal ring 100 is attached using a tapering tool 107 as shown in FIG. 12. FIG. 12 is a schematic perspective view of the state of the seal ring 100 attached using the tapering tool 107 as shown in FIG. 12.

To attach the seal ring 100, the seal ring 100 with the separating part S closed (i.e., the recess and projection are snugly fitted together) is first fitted on the periphery of the small-diameter part 107a of the tapering tool 107. Then, the seal ring 100 is pushed further toward a large-diameter part 107b along a tapering periphery 107c, whose diameter gradually increases toward the large-diameter part 107b from the small-diameter part 107a, thereby increasing the diameter of the seal ring 100 such that the separating part S is opened. Subsequently, the seal ring 100 is caused to fall into the annular groove 301 in a shaft 300 from the large-diameter part 107b. Then, the separating part S is allowed to return to its closed state again by the elastic resiliency of the seal ring 100. Thus, the seal ring 100 is attached in the annular groove 301.

When the seal ring 100 is caused to fall into the annular groove 301 and then the separating part S returns to its original closed state from the open one, the projection 103 and recess 104 slide against each other by face-to-face contact (etc., sliding seal faces 105a and 105b). As a result, slide resistance between the recess and projection when fitting together increases, degrading the attachability of the seal ring 100.

That is, since the slide resistance is high, the separating part S may not return to its original fitting state with only the elastic resiliency of the seal ring 100, ends up requiring an additional task for returning the separating part S to its original fitting state.

If the task for returning the separating part S to its original fitting state is inadequate, the seal ring 100 may be fitted to the housing 200, with the separating part S fitting inadequately. For example, the leading end side of the side face 104b extending concentric to the axis of the recess 104 may push the projection 103 upward in the direction of the outer circumference, with the result that a part of the projection 103 juts out toward the outer circumferential side, as shown in FIG. 13; and the seal ring 100 may be fitted to the housing 200, with the separating part S abnormally deformed. Such a jutting portion may interfere with the housing 200 during the fitting of the shaft 300 to the housing 200 and cause, for example, damage to the seal ring 100.

In addition, if the projection 103 and recess 104 do not slide against each other smoothly, stretching of the separating part S in the direction of the circumference may be impeded when the seal ring 100 is subject to oil pressure and is stretched in the direction of the outside diameter (i.e., when the seal ring 100 is pressed against the inner circumferential face of the shaft hole 201 of the housing 200). There is a concern that this may make the position of the seal ring 100 unstable and affect sealability.

SUMMARY

The present disclosure has been proposed in view of the problems of the conventional technique described above. It is accordingly an object of the present disclosure to provide a seal ring that has improved attachability and sealability.

In order to achieve the foregoing object, there is provided a seal ring, being separated from each other in one area and having a shape with ends, and being inserted in an annular groove in a shaft by temporarily moving both the fittable ends away from each other, and thereby sealing an annular gap between the shaft and a housing that has a shaft hole into which the shaft is inserted, the seal ring being configured such that one of the ends has a projection projecting in the direction of the circumference of the seal ring; and the other end has a recess used in combination with the projection. The projection and the recess are fitted together while sliding against each other, thereby bringing both the ends into contact with each other. The seal ring is characterized in that the recess has an inclining side face, which inclines from the direction of the circumference, and the projection and the recess form a sliding part so that a part of the edge of the leading end of the projection slides over the inclining side face of the recess. A portion of the sliding part is formed as a linear sliding portion.

A portion of the sliding part of the projection and recess is formed so as to adopt linear contact. This reduces the area of the sliding part, and hence slide resistance between the projection and recess. Accordingly, by virtue of elastic resiliency, the restoration of the ends of the seal ring to their fitting state becomes smooth, improving the attachability of the seal ring.

In addition, since slide resistance between the projection and recess is reduced, the ends of the seal ring can be restored to their fitting state only with the elastic resiliency of the seal ring. Accordingly, a task for restoring both the ends of the seal ring to their fitting state is not required, thus improving workability in attaching the seal ring.

Also, the present disclosure prevents the shaft from being fitted to the housing, with both the ends of the seal ring restored to their fitting state inadequately. This restrains interference between the seal ring and housing during fitting of a shaft. Specifically, a part of the seal ring is prevented from jutting out due to insufficient fitting of both the ends and interfering with the housing during insertion of the shaft. This prevents interference between the housing and the seal ring from causing, for example, damage to the seal ring and hence degradation in the sealability of the seal ring.

Further, slide resistance between the projection and recess is reduced. Accordingly, when the seal ring is in use, both ends are smoothly stretched or compressed in the direction of the circumference. This improves the ability of the seal ring to follow any change in the length of the circumference and its ability to stretch when it is subject to pressure. Accordingly, the sealability of the seal ring is improved.

The inclining side face of the recess may incline such that the entrance side of the recess, which the projection enters, may be thinner than the deepest part side of the recess.

In such a configuration, the entrance side of the recess, which the projection enters, is made less rigid than the deepest part side of the recess. This decreases slide resistance between the recess and projection and restrains inadequate fitting of the recess and projection and hence an abnormal degree of deformation of the projection during their fitting. It prevents, therefore, a part of the projection from jutting out and interfering with the housing during insertion of the shaft.

BRIEF DESCRIPTION OF THE DRAWINGS

FIG. 8 shows a table of the results of evaluations of the resiliency of and leakage from the separating part of the seal ring in FIG. 1.

DETAILED DESCRIPTION

The best modes for carrying out the present disclosure will now be described in detail, by way of examples, with reference to the accompanying drawings. It is to be understood that the scope of the present disclosure is not limited by the dimensions, materials, shapes, relative positions, etc., of composing members described in the embodiments, unless otherwise specified.

First Embodiment

Configuration and Outline of Seal Ring

Figure 1:
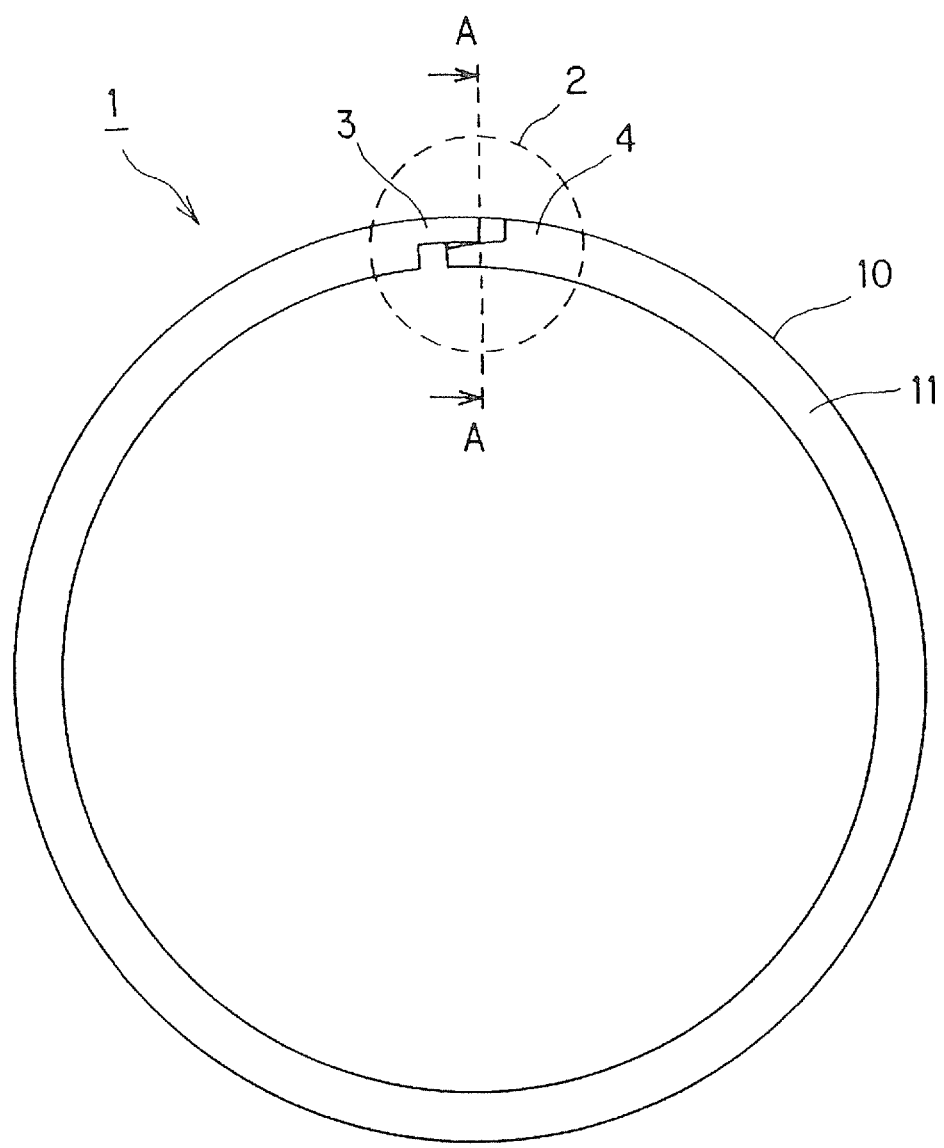
FIG. 1 is shows the entire seal ring according to a first embodiment.
Figure 2:
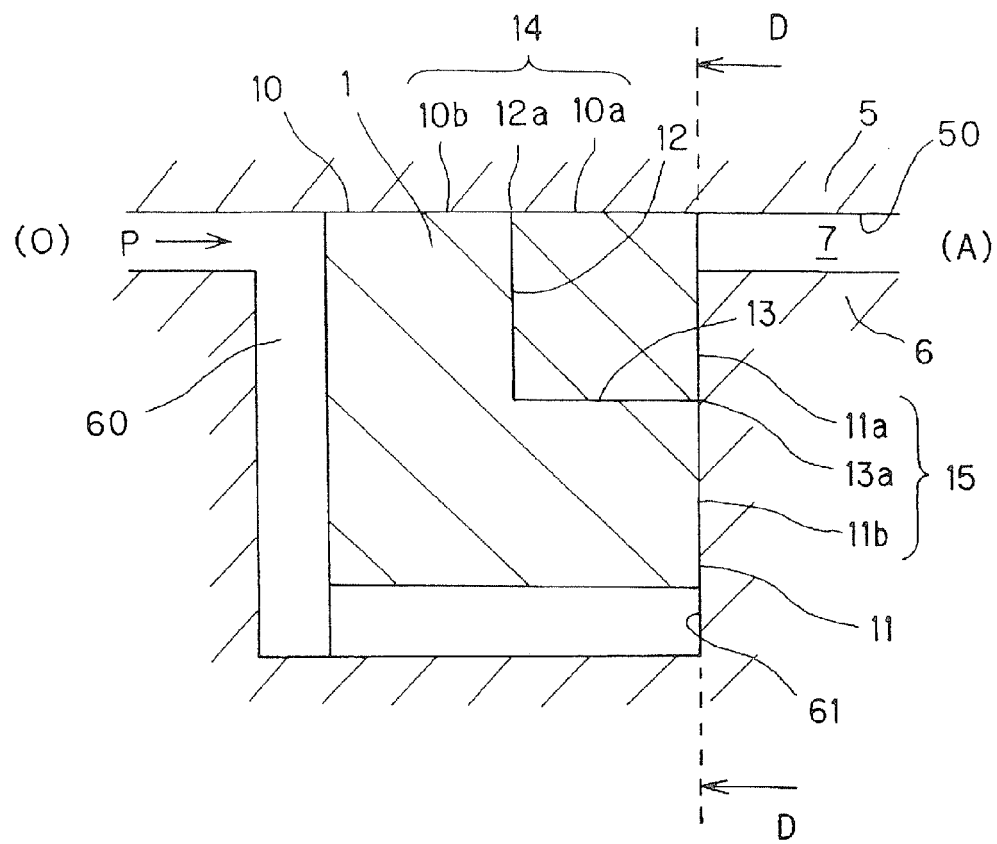
FIG. 2 is a sectional view of the seal ring in FIG. 1 and illustrates it while in use.

The configuration and outline of a seal ring according to a first embodiment according will now be described with reference to FIGS. 1 and 2. FIG. 1 shows the entire seal ring 1, as viewed from the axial direction of the seal ring 1. FIG. 2 is a sectional view of the seal ring 1 according to the present embodiment and illustrates it while in use, which corresponds to a section taken along the line A-A in FIG. 1.

The seal ring 1 is an approximately annular member, and one part of the seal ring 1 is separated from the other in one area (i.e., separating part 2) of its circumference. The separating part 2 is configured such that a recessed shape at one end 3 and a projecting shape at the other end 4 can fit together.

The seal ring 1 is made of a resin material, such as polyetheretherketone (PEEK), polytetrafluoroethylene (PTFE), or ethylene-tetrafluoroethylene (ETFE).

The seal ring 1 seals an annular gap between the two members fitted together such that they can freely move relative to each other. In this embodiment, as shown in FIG. 2, this seal ring seals the annular gap 7 between a housing 5 and a shaft 6 inserted in a shaft hole 50 formed in the housing 5.

The seal ring 1 is fitted in an annular groove 60 formed in the periphery of the shaft 6, and is pressed toward the non-sealed fluid side A by oil pressure P acting from the sealed fluid side O. Consequently, the outer circumferential face 10 comes into close contact with the inner circumferential face of the shaft hole 50 in the housing 5 and the end face 11 on the non-sealed fluid side A comes into close contact with the side wall 61 (on the non-sealed fluid side A) of the annular groove 60 of the shaft 6.

This restrains the sealed fluid from leaking toward the non-sealed fluid side A from the sealed fluid side O. The sealed fluid is, for example, lubricating oil. In the automatic transmission of a vehicle, in particular, it refers to Automatic Transmission Fluid (ATF).

<Separating Part>

Figure 3A:
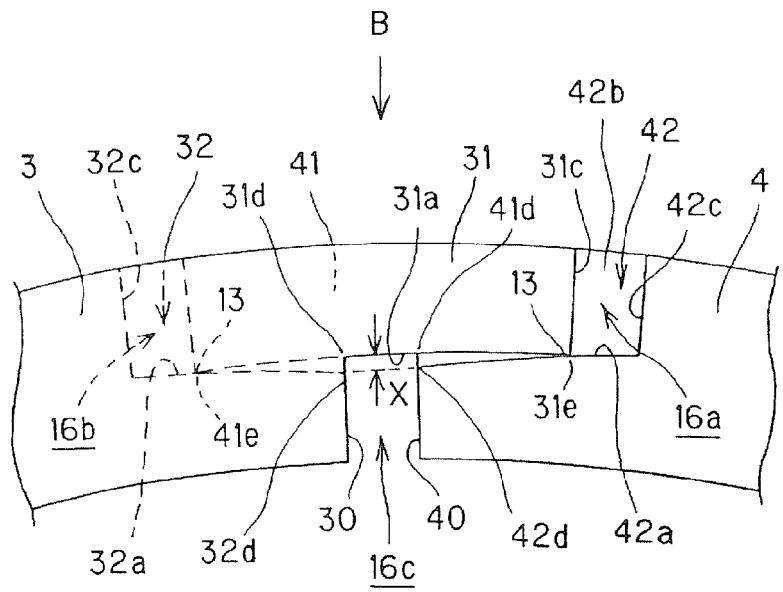
FIG. 3 shows a structure of a separating part of the seal ring in FIG. 1.
Figure 3B:
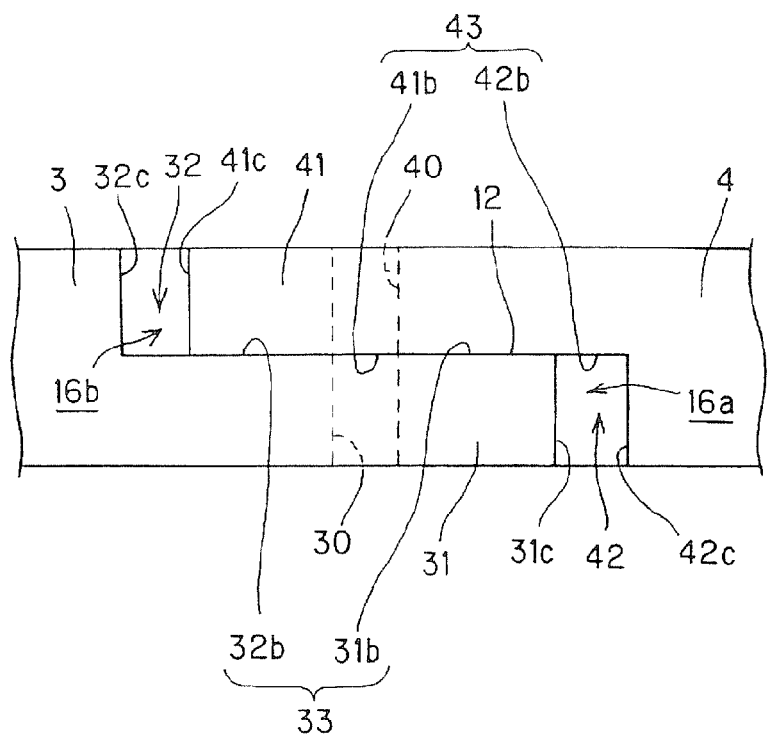
Figure 4A:
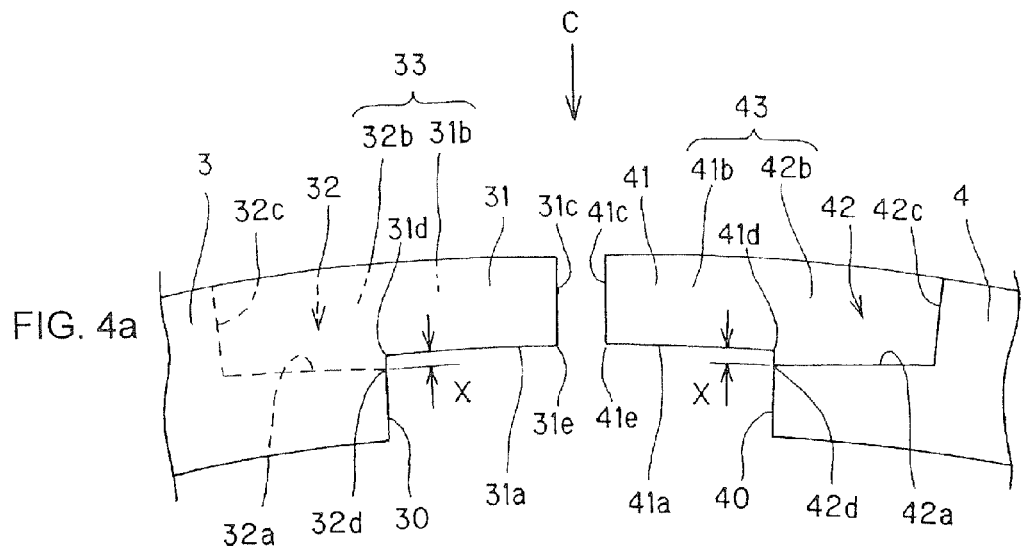
FIG. 4 shows a state in which the separating part of the seal ring is open.
Figure 4B:
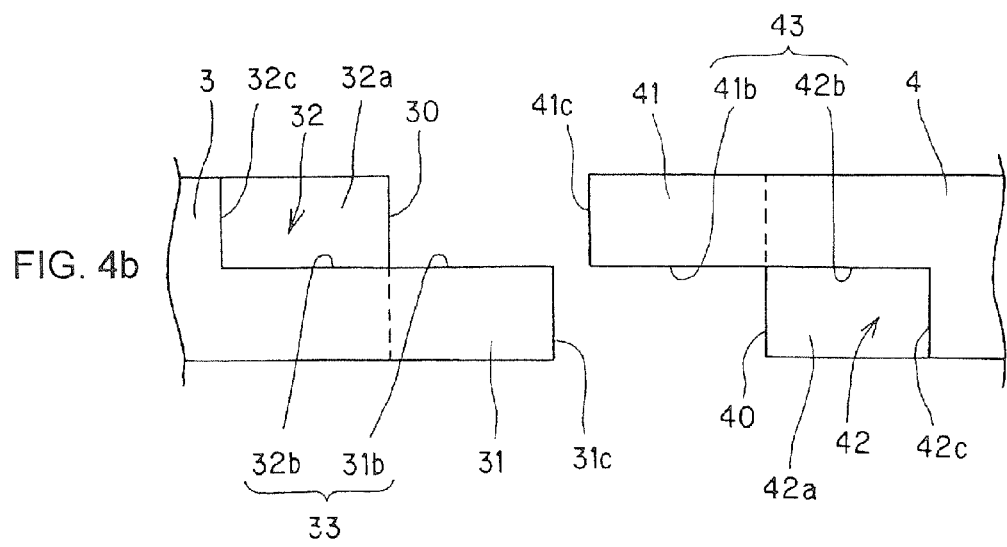
Figure 5:
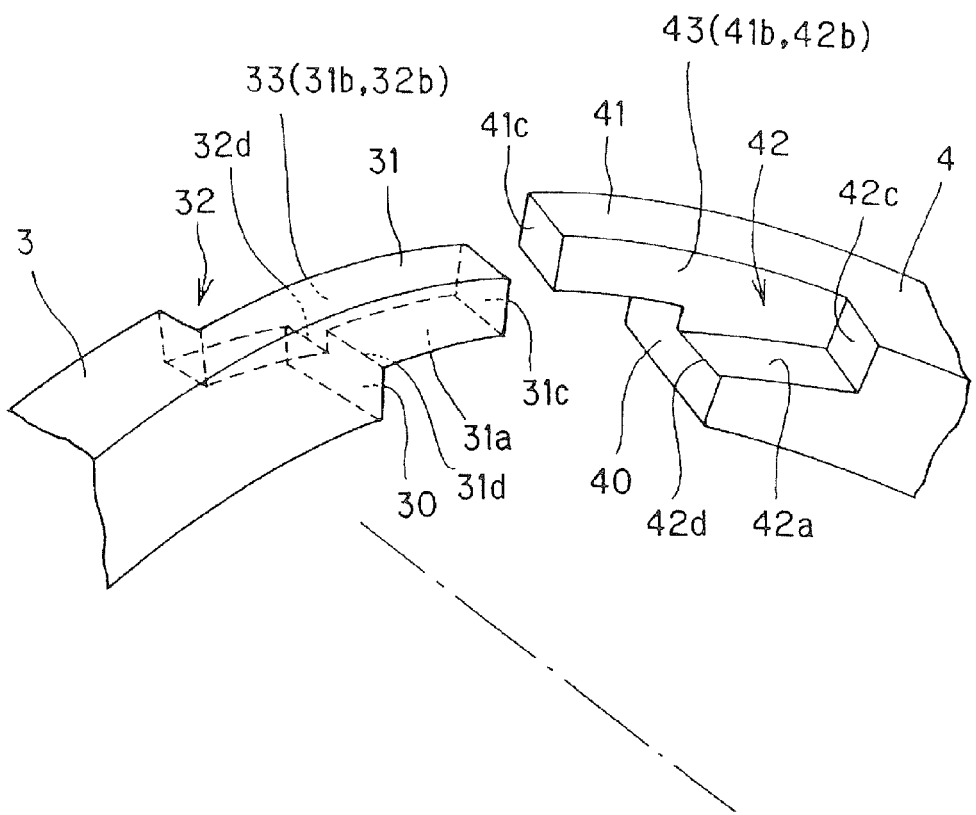
FIG. 5 is a perspective view of the shape of the ends of the seal ring in FIG. 1.

Referring to FIGS. 3 to 5, next will be described in detail the configuration of the separating part 2 of the seal ring 1. FIG. 3 shows the structure of the separating part 2, in which (a) shows it as viewed from the axial direction, and (b) shows it as viewed from arrow B in (a). FIG. 4 shows a state in which the separating part 2 is open, in which (a) shows it as viewed from the axial direction, and (b) shows it as viewed from arrow C in (a). FIG. 5 is a perspective view of the shape of the separating part 2. Of the two ends of the seal ring 1, the one end (the left one in FIGS. 3 to 5) and the other end (the right one) will hereinafter be called a "first end 3" and a "second end 4" respectively.

The first end 3 has a first end face 30 in the direction of the diameter. The first end 3 has a first projection 31 projecting in the direction of the circumference from the first end face 30, and a first recess 32 receding in the direction of the circumference from the first end face 30. The first projection 31 and the first recess 32 are formed adjacent to each other in the axial direction.

The first projection 31 has a side face 31*a* extending from the first end face 30 in the direction of the circumference and concentric to the axis, a side face 31*b* located adjacent to the side face 31*a* and perpendicular to the axis, and a leading-end face 31*c* located in the direction of the diameter and adjacent to the side faces 31*a* and 31*b*.

The first recess 32 has an inclining side face 32*a* parallel to the axis and inclining toward the inner circumference side from the deepest part of the first recess 32 to the open side (i.e., on the first end face 30 side) in the direction of the circumference, a side face 32*b* located adjacent to the side face 32*a* and extending perpendicular to the axis, and a deepest part face 32*c* located in the direction of the diameter and adjacent to the side faces 32*a* and 32*b*.

The end 32*d* on the first end face 30 side of the inclined side face 32*a* of the first recess 32 is located further on the inner diameter side by X degree than the end 31*d* on the first end face 30 side of the side face 31*a* of the first projection 31.

The side face 31*b* of the first projection 31 and the side face 32*b* of the first recess 32 coincide in the axial direction and form a first slide face 33 that is continuous in the direction of the circumference.

On the other hand, the second end 4 is identical in shape to the first end 3. Specifically, the second end 4 has a second end face 40 located in the direction of the diameter, a second projection 41 projecting in the direction of the circumference from the second end face 40, and a second recess 42 receding in the direction of the circumference from the second end face 40. These are formed adjacent to one another in the axial direction.

In addition, the second projection 41 has a side face 41*a* extending concentric to the axis, a side face 41*b* extending perpendicular to the axis, and a leading-end face 41*c* located in the direction of the diameter. The second recess 42 has: an inclining side face 42*a* extending substantially concentric to the axis; a side face 42*b* extending perpendicular to the axis; and a deepest part face 42*c* located in the direction of the diameter.

In addition, the inclining side face 42*a* of the second recess 42 inclines such that end 42*d* on the second-end-face 40 side is located further on the inside diameter by X degree than end 41*d* (on the second-end-face 40 side) of the side face 41*a* of the second projection 41. The side face 41*b* of the second projection 41 and the side face 42*b* of the second recess 42 form a second sliding face 43 that is continuous in the direction of the circumference.

Both the ends 3 and 4 are identical in shape. Therefore, in the position where they face each other in the separating part 2, the axial dispositions of their projections and recesses are opposite to each other, thereby forming a combination of the first projection 31 and second recess 42 and a combination of the second projection 41 and first recess 32.

<Attachment of Seal Ring>

Figure 12:
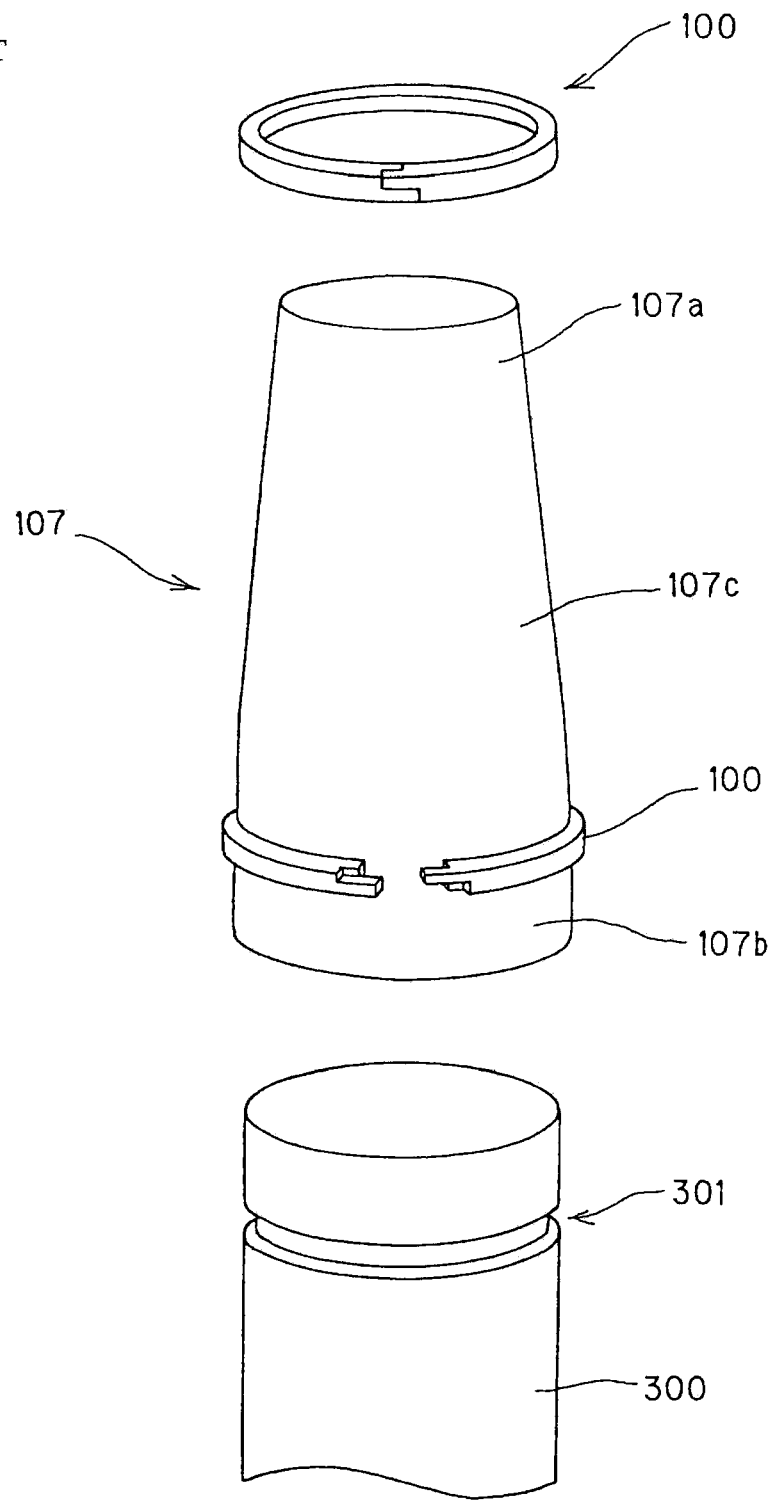
FIG. 12 is a perspective view of the state of s seal ring attached using a tapering tool.
Figure 13:
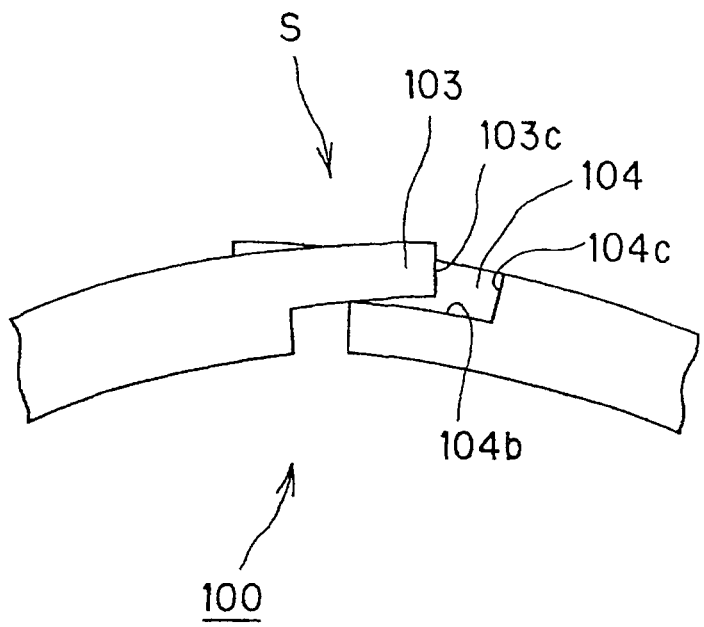
FIG. 13 is a side view showing the fitting state of the separating part of a seal ring according to a conventional technique.

Since the seal ring 1 has such a separating part 2, it can be attached to the annular groove 60 of the shaft 6 easily. Using a tapering tool 107, as shown in FIG. 12, the seal ring 1 is elastically increased in diameter until the separating part 2 is open (i.e., the one part is separated from the other). In this state, the seal ring 1 is caused to fall into the annular groove 60 of the shaft 6. Then, the separating part 2 returns to its closed (i.e., fitting) state by virtue of the elastic resiliency of the seal ring 1, and the seal ring is thus attached to the annular groove 60.

When the separating part 2 returns to its original closed state from the open one, the first end 3 and the second end 4, which are separate from each other in the direction of the circumference, approach each other more nearly and consequently the first projection 31 and second projection 41 are combined with the second recess 42 and the first recess 32 respectively.

When the first and second slide faces 33 and 43, formed by the corresponding side faces extending perpendicular to the axis, are brought into contact with each other by the fitting of the first and second ends 3 and 4, the first end 3 and the second end 4 form a first sliding seal 12 which is perpendicular to the axis and slidable in the direction of the circumference.

The second recess 42 and first recess 32 are configured such that, by forming the inclining side faces 42*a* and 32*a*, the dimensions in the direction of the diameter of the open parts of the second recess 42 and first recess 32 are greater by X degree than those of the leading-end face 31*c* of the first projection 31 and the leading-end face 41*c* of the second projection 41 respectively.

As the first projection 31 and second projection 41 enter the second recess 42 and first recess 32 respectively in order to fit the first and second ends 3 and 4, the first and second projections 31 and 41 come into oblique contact with the inclining side faces 42*a* and 32*a* respectively. Specifically, the inner circumferential side edge 31*e* (i.e., the corner between the leading-end face 31*c* and side face 31*a*) of the leading-end face 31*c* of the first projection 31 and the inner circumferential side edge 41*e* (i.e., the corner between the leading-end face 41*c* and side face 41*a*) of the leading-end face 41*c* of the second projection 41 come into linear contact with the inclining side faces 42*a* and 32*a* respectively.

Thus, a linear sliding seal portion 13 is formed, which extends parallel to the axis and is movable on the inclining sides 42*a* and 32*a* substantially in the direction of the circumference (i.e., in the direction inclining to direction of the circumference).

For purposes of manufacturing the seal ring 1, it may be designed such that the leading-end face 31*c* of the first projection 31 and the leading-end face 41c of the second projection 41 coincide with the deepest part face 42c of the second recess 42 and the deepest part face 32c of the first recess 32 respectively in the direction of the circumference, thereby snugly fitting both the ends 3 and 4. In this case, the first projection 31 and second projection 41 may return to their original states without coming into contact with the inclining side faces 42a and 32a respectively. However, depending on the degree to which the seal ring 1 is deformed when it is attached, the first projection 31 and second projection 41 may actually come into contact with the inclining side faces 42a and 32a respectively before the ends 3 and 4 fit together snugly again.

Thus, where the first projection 31 and the second projection 41 come into contact with the inclining side faces 42a and 32a respectively before the ends 3 and 4 return to their snugly fitted state (i.e., the state in which the housing 5 and the shaft 6 are allowed to fit together), the inner-circumferential-side edges 31e and 41e of the first and second projections 31 and 41 come into linear contact with and slide over the inclining side faces 42a and 32a respectively, and thus the both the ends 3 and 4 return to their snugly fitted state.

As described above, portions of the sliding parts where the first and second projections 31 and 41 slide over the second and first recesses 42 and 32 respectively are formed as linear contact sliding portions. This reduces the areas of the sliding portions, and hence slide resistance between the first and second projections 31 and 41 and the second and first recesses 42 and 32 respectively. Accordingly, by virtue of the elastic resiliency of the seal ring 1, the restoration of the ends 3 and 4 to their fitting state becomes smooth, improving the attachability of the seal ring 1.

This prevents insufficient return of the ends 3 and 4 to their fitting state when the seal ring is attached. Accordingly, the need to return them to that state is eliminated and efficiency to attach the seal ring 1 is improved.

Moreover, insufficient fitting of the ends 3 and 4 of the seal ring 1 is thus prevented. Accordingly, when the seal ring 1 is attached to the housing 5, the seal ring 1 and housing 5 are prevented from interfering with each other. Specifically, this prevents part of a seal ring 1 from jutting out due to insufficient fitting of the ends 3 and 4, and interfering with the housing 5 during insertion of the shaft 6. Accordingly, seal ring 1 is prevented from, for example, being damaged due to interference between the housing 5 and the seal ring 1, resulting in degradation in its sealability of the seal ring 1.

In addition, the open sides (i.e., the sides from which the first and second projections 31 and 41 enter) of the second and first recesses 42 and 32 increase in dimension in the direction of the diameter. This prevents the first projection 31 and second projection 41 when entering the second recess 42 and first recess 32 respectively, from being caught by the end 42d of the second end face 40 and the end 32d of the first end face 30 respectively in the corresponding openings. Accordingly, attachability of the seal ring 1 is improved.

Additionally, the open sides of the second and first recesses 42 and 32 are thinner and hence less rigid than the deepest part faces 42c and 32c side thereof. This decreases slide resistance between the first projection 31 and second projection 41 and the second recess 42 and first recess 32 respectively, and prevents their fitting insufficiently and also abnormal degrees of deformation of the first and second projections 31 and 41 when fitting. Accordingly, the first and second projections 31 and 41 are prevented from being deformed, such as being pushed up (or curved) toward the outer circumferential side, by the open side ends of the inclining side faces 42a and 32a of the second recess 42 and first recess 32 respectively, with the result that their leading ends jut out toward the outer circumferential side and interfere with the housing 5 during the insertion of the shaft 6.

<Where Seal Ring is in Use>

Figure 6A:
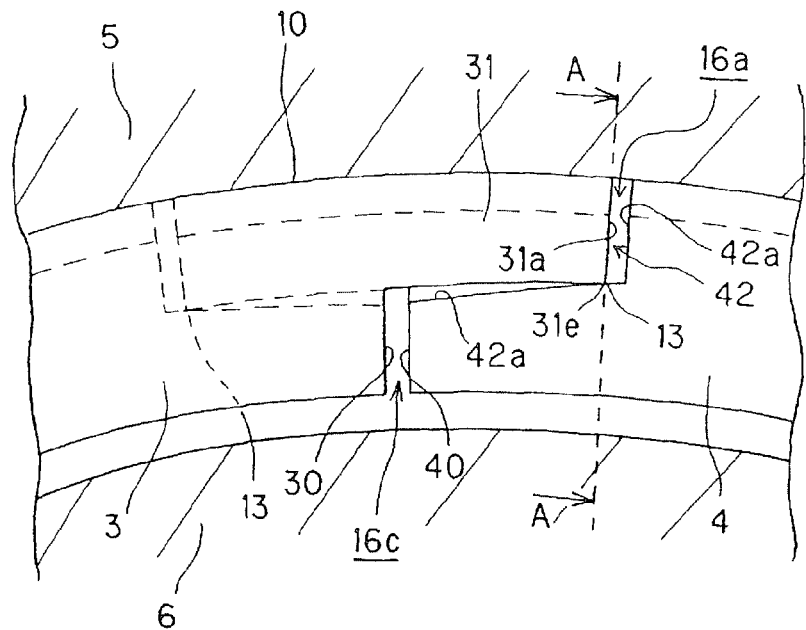
FIG. 6 illustrates the separating part of the seal ring in FIG. 1 while in use.
Figure 6B:
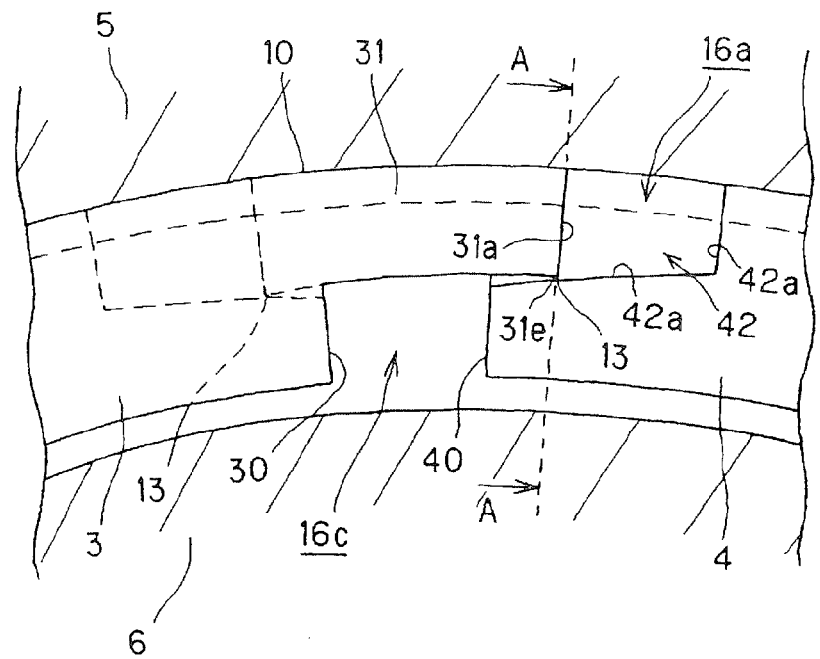
Figure 7A:
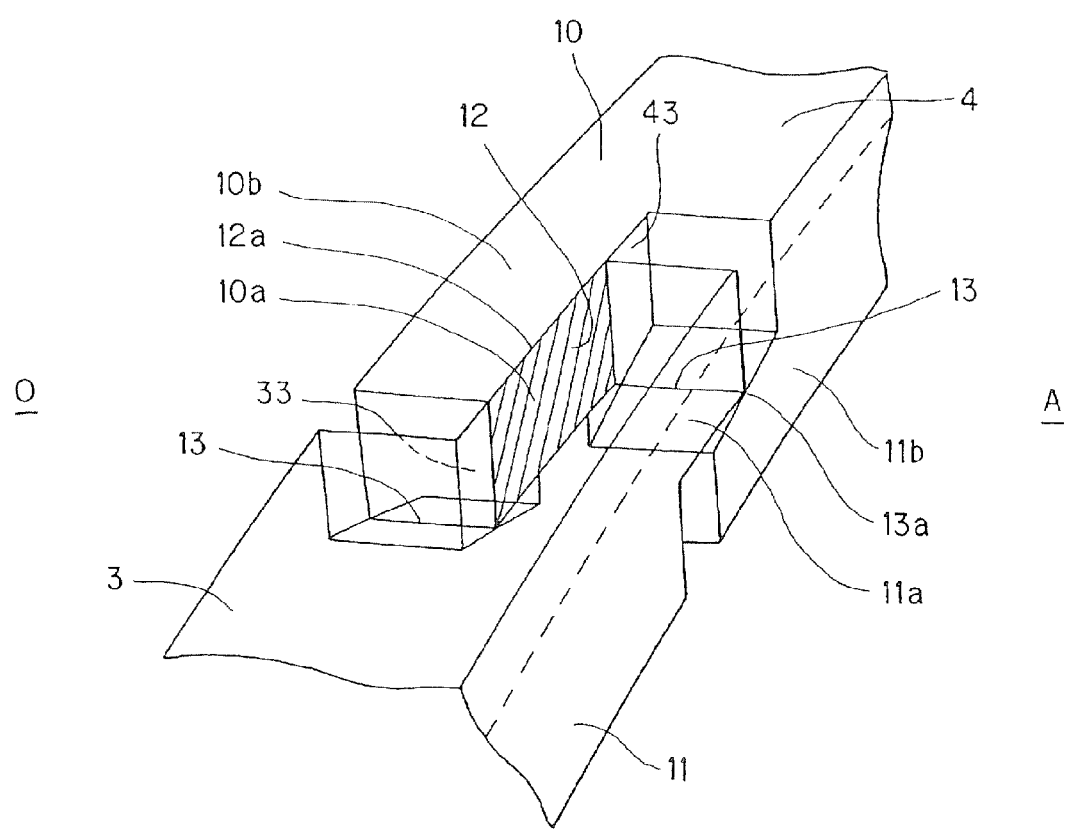
FIG. 7a is a perspective view of seal portions of a seal ring in FIG. 1.
Figure 7B:
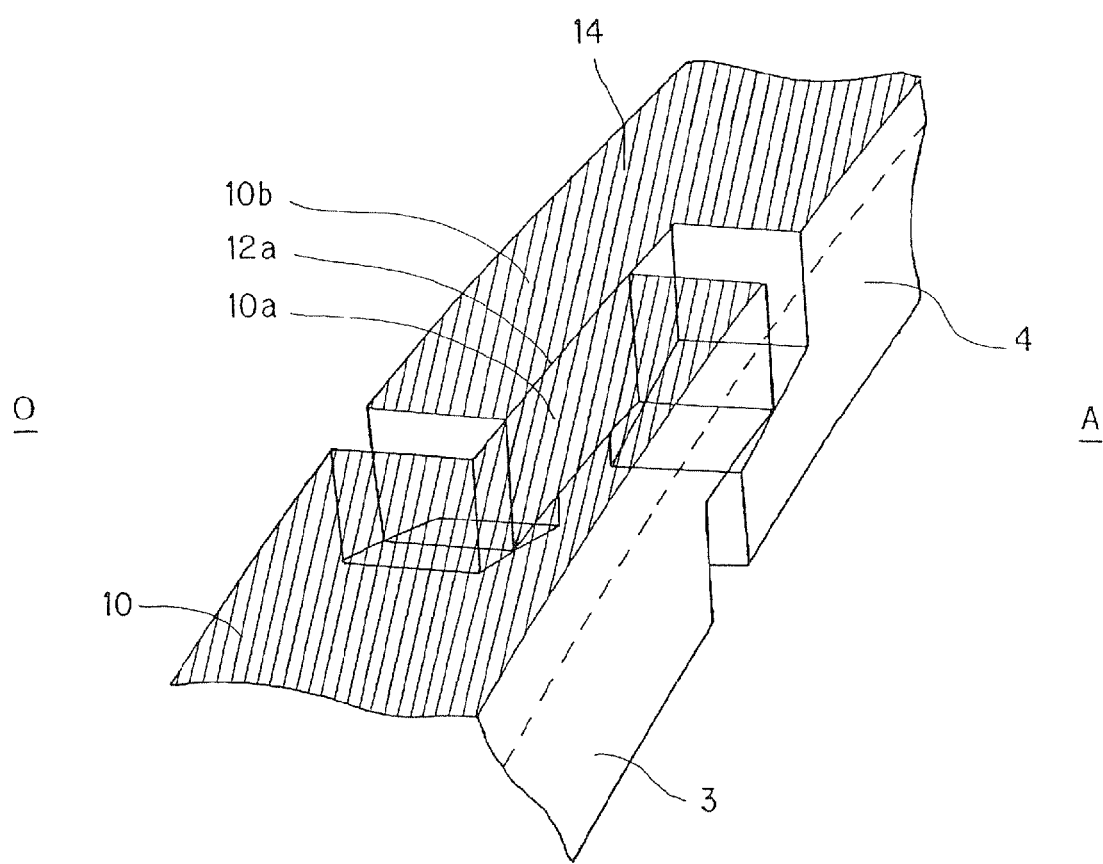
FIG. 7b is a perspective view of another seal portion of the seal ring in FIG. 1.
Figure 7C:
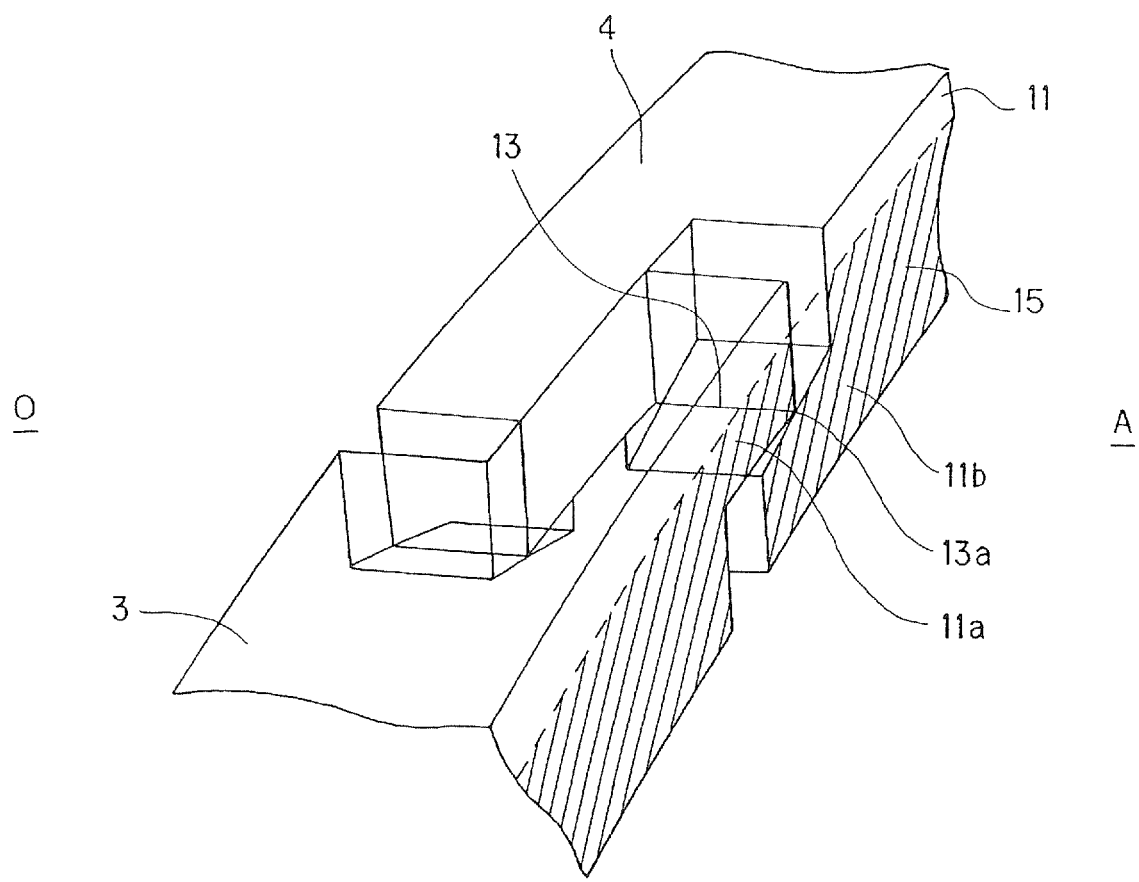
FIG. 7c is a perspective view of another seal portion of the seal ring in FIG. 1.

Referring to FIG. 6 and FIGS. 7a to 7c, next will be described the separating part 2 when the seal ring 1 according to the present embodiment is in use. FIG. 6 is a side view of the separating part 2 corresponding to the D-D section in FIG. 2, in which (a) and (b) show compressed and stretched states, respectively, of the separating part 2 in the direction of the circumference. FIGS. 7a to 7c are schematic perspective views of the sealed part of the seal ring 1 according to the present embodiment. FIG. 7a shows the first sliding seal portion 12 and the second sliding seal portion 13, and FIGS. 7b and 7c show a first annular seal portion 14 and a second annular seal portion 15 respectively.

By virtue of pressure P acting from the sealed fluid side O, the outer circumferential face 10 of seal ring 1 is brought into close contact with the inner circumferential face of the shaft hole 50 of the housing 5, and the end face 11 on the non-sealed fluid side A is brought into close contact with the side wall face 61 of the annular groove 60 of the shaft 6.

In this case, in the separating part 2, the sliding seal face 33 of the first end 3 and the sliding seal face 43 of the second end 4 are in face to face contact, thereby forming the first sliding seal portion 12 (see FIG. 7a). The outer circumferential face 10 of the seal ring 1 is configured such that the first-end 3 side 10a and the second-end 4 side 10b are connected via the outer circumferential side end edge 12a of the first sliding seal portion 12 (see FIG. 7b). Thus, in the seal ring 1, the substantially annular and continuous first annular seal portion 14 is formed in the plane where the seal ring 1 is in contact with the inner circumferential face of the shaft hole 50.

In the separating part 2, the inner circumferential side edge 31e of the leading-end face 31c of the first projection 31 and the inner circumferential side edge 41e of the leading-end face 41c of the second projection 41 come into linear contact with the inclining side face 42a of the second recess 42 and the inclining side face 32a of the first recess 32 respectively, thereby forming a second sliding seal portion 13 (see FIG. 7a). The end face 11 on the non-sealed fluid side A of the seal ring 1 is configured such that a first end 3 side 11a and a second end 4 side 11b are connected in point contact with each other via the end 13a of the second sliding seal portion 13 on the non-sealed fluid side A (see FIG. 7c). Thus, in the seal ring 1, the substantially annular and continuous second annular seal portion 15 is formed in the plane where the seal ring 1 is in contact with the side wall face 61 of the annular groove 60.

In addition, the seal ring 1 is designed so that a gap is defined between the end faces of both the ends 3 and 4 for absorbing any change in the length of the circumference of the seal ring 1 during use. That is, the dimensions of the seal ring 1 are designed such that, at normal temperatures, the first projection 31 and second projection 41 enter the second recess 42 and first recess 32 respectively only up to a certain point. Specifically, a gap 16a is defined between the leading-end face 31c of the first projection 31 and the deepest part face 42c of the second recess 42, and a gap 16b is defined between the leading-end face 41c of the second projection 41 and the deepest part face 32c of the first recess 32 (see FIG. 3). Likewise, a gap 16c is defined between the first end face 30 and second end face 40.

In this configuration, if the circumference length of the seal ring 1 increases due to rise in temperature during the operation of a hydraulic device, the sliding seal faces 33 and 43 slide in the direction of the circumference, hence both ends 3 and 4 move nearer to each other (i.e., the separating part 2 is compressed in the direction of the circumference) in the direction of the circumference, and the gaps 16a, 16b, and 16c become narrower. Thus, any increase in length of the circumference of the seal ring 1 is absorbed (see FIG. 6(a)).

Conversely, when the circumference length of the seal ring 1 decreases due to a fall in temperature, the sliding seal faces 33 and 43 slide in circumferential directions opposite to each other, hence the ends 3 and 4 move away from each other in the direction of the circumference (i.e., the separating part 2 is stretched in the direction of the circumference), and the gaps 16a, 16b, 16c become wider. Thus, any decrease in the length of the circumference of the seal ring 1 is absorbed (see FIG. 6(b)).

If oil pressure P acts on the seal ring 1 when no pressure is applied to the seal ring 1 or if the force with which the seal ring 1 is pressed against the inner circumferential face of the shaft hole 50 of the housing 1 increases due to an increase in oil pressure P, the force acting on the seal ring 1 in the direction of the diameter increases. In this case, the separating part 2 stretches in the direction of the circumference following the deformation of the seal ring 1 in the direction in which the diameter increases due to the oil pressure P. Accordingly, an abnormal degree of deformation, etc., of the seal ring 1 is suppressed and the position of the seal ring 1 stabilizes.

Even where the sliding seal faces 33 and 43 slide in the direction of the circumference due to stretching of the separating part 2, face contact is maintained. Accordingly, the first sliding seal portion 12 is maintained. In addition, even when the inner circumferential side edges 31e and 41e slide over the inclining side faces 42a and 32a respectively due to stretching or compression of the separating part 2, their linear contact with the inclining side faces 42a and 32a is maintained. Accordingly, the second sliding seal portion 13 is also maintained.

The seal ring 1 is designed such that the diameters of the inner circumferential side edges 31e and 41e (i.e., the inside diameters of the first and second projections 31 and 41) are substantially greater than those of the inclining side faces 32a and 42a respectively. Therefore, even when the separating part 2 closes (i.e., even when the first projection 31 and second projection 41 enter into the second recess 42 and first recess 32 respectively in the direction of the circumference), the inner circumferential side edges 31e and 41e may separate from the inclining side faces 32a and 42a respectively, depending on the degree to which the first and second projections 31 and 41 have entered, with the result that they may not come into contact with each other. That is, the second sliding seal portion 13 may not be formed. However, in the actual use of the seal ring 1, the seal ring 1 deforms due to force in the direction of the outside diameter exerted by oil pressure P, such that the inclining side faces 42a and 32a may be pushed onto the inner circumferential face side (i.e., outer circumferential side) of the shaft hole 50. Accordingly, regardless of the degree to which the first and second projections 31 and 41 have entered, contact between the inner circumferential side edges 31e and 41e and the inclining side faces 32a and 42a respectively is maintained. Therefore, the A-A sections in FIGS. 6(a) and (b) is a section in which the second sliding seal portion 13 is formed, as shown in FIG. 2.

Accordingly, the gap 16a defined between the leading-end face 31c of the first projection 31 and the deepest part face 42c of the second recess 42 is connected with an annular gap 7 on the non-sealed fluid side A but is kept disconnected from the sealed fluid side O by the first sliding seal portion 12, second sliding seal portion 13, first annular seal portion 14 and second annular seal portion 15. This prevents formation of a gap that might allow communication between the sealed fluid side O and non-sealed fluid side A due to the compression and stretching of the separating part 2.

Furthermore, the seal ring 1 stabilizes its position by virtue of the compression and stretching of the separating part 2 regardless of any change in temperature or oil pressure, thus restraining leakage of the sealed fluid from the separating part 2 and hence maintaining satisfactory sealing performance.

Additionally, the seal ring 1 uses portions of the sliding parts of both the ends 3 and 4 as sliding portions which adopt linear contact, similar to the second sliding seal portion 13. Consequently, slide resistance between the ends 3 and 4 decreases, making stretching and compression of the separating part 2 smooth in the direction of the circumference. This improves the ability of the seal ring 1 to follow any change in the length of the circumference and its ability to stretch when it is subject to pressure. Accordingly, the sealability of the seal ring 1 is improved.

<Others>

Figure 10:
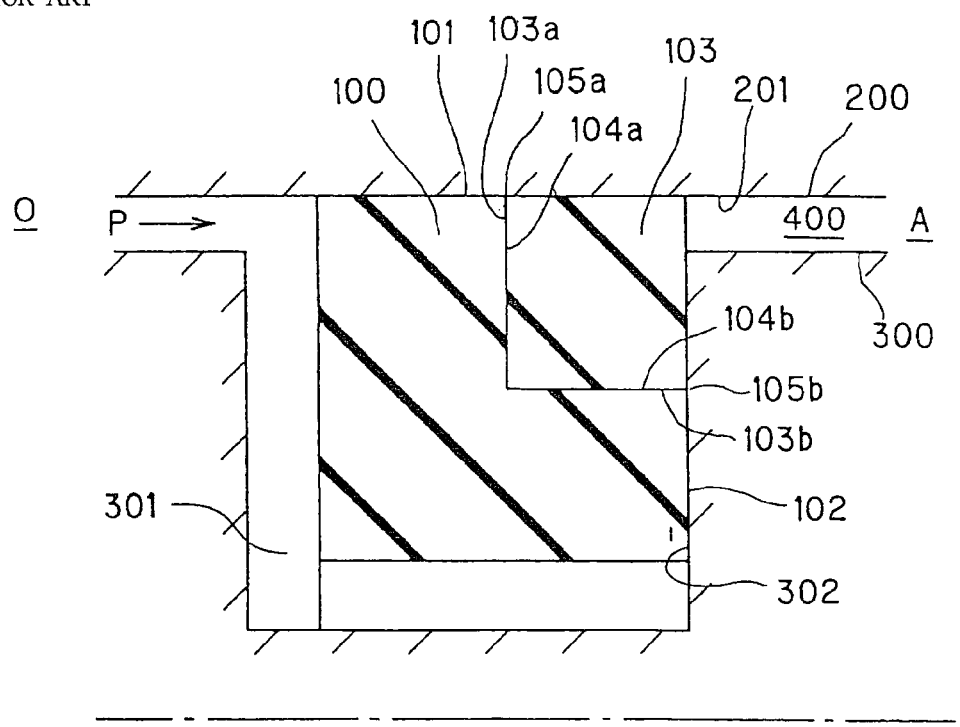
FIG. 10 shows a sectional view of a seal ring according to a conventional technique and illustrates it while in use.
Figure 11:
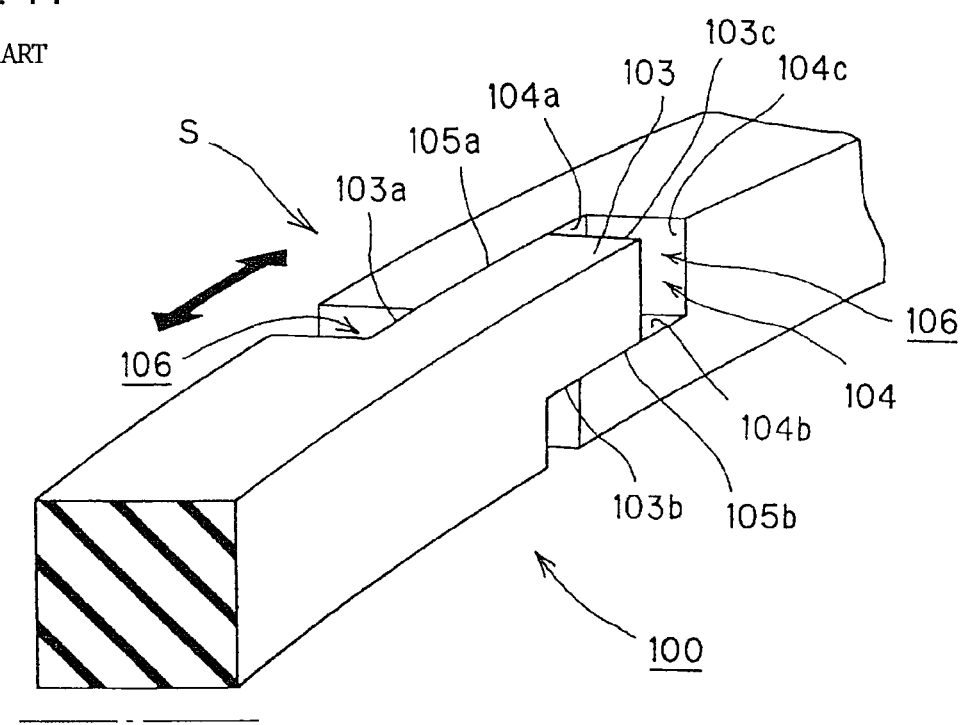
FIG. 11 is a perspective view of the configuration of a separating part of the seal ring according to the conventional technique.

Each of the inclining side faces of the second and first recesses 42 and 32 of the seal ring 1 according to the present embodiment is shaped as by obliquely cutting in the direction of the circumference the side face 105b of the recess 104 of the conventional seal ring 100 as shown in FIG. 10.

In the manufacture of a seal ring with such an inclining side face, this inclining side face may be formed by, for example, cutting work after the formation of a conventional seal ring. Alternatively, it may be formed when the seal ring is molded.

The inclinations of the inclining side faces 42a and 32a are formed so that differences between the side faces 41a and 31a and the ends 42d and 32d, respectively, are X dimensions in the direction of the diameter. If the value X is too small, the elastic resiliency of the seal ring 1 may not return the separating part 2 to its fitting state (i.e., insufficient fitting state), when the seal ring 1 is attached in the annular groove 60. If the value X is too large, the sliding seal portion 13 may not be maintained, resulting in a gap in the separating part 2 and an increase in leakage. Therefore, the value X has to be set based on the specifications of the seal ring, the environment in which it is used, etc., as required. In the seal ring 1 according to the present embodiment, the value X can be in the range of 0.01 mm to 0.05 mm.

FIG. 8 shows the results of evaluations of the resiliency of and leakage from the separating part of the seal ring according to the present embodiment. In the table in FIG. 8, the symbol O means that the resiliency of the separating part has been satisfactory. Specifically, when the seal ring is attached, the separating part, once opened, closes again (i.e., it returns to an adequate fitting state). The symbol X means that, the separating part does not close (i.e., the fitting state is inadequate) after the attachment of the seal ring. The evaluation conditions for leakage are as follows: pressure oil at 1.4 MPa; temperature at 160° C.; the number of shaft revolving at 0 rpm; and a sealed fluid, ATF.

As shown in FIG. 8, where the value X was 0.00 mm, that is, where the side face of the recess was not inclined, as in a conventional seal ring, the resiliency of the separating part was unsatisfactory. Where the value X was 0.10, the resiliency of the separating part was satisfactory but leakage from the separating part increased.

On the other hand, where the value X was 0.01 and 0.05, the resiliency of the separating part was satisfactory and leakage from the separating part was stable. Accordingly, the value X can be set in the range from 0.01 mm to 0.05 mm.

Second Embodiment

Figure 9A:
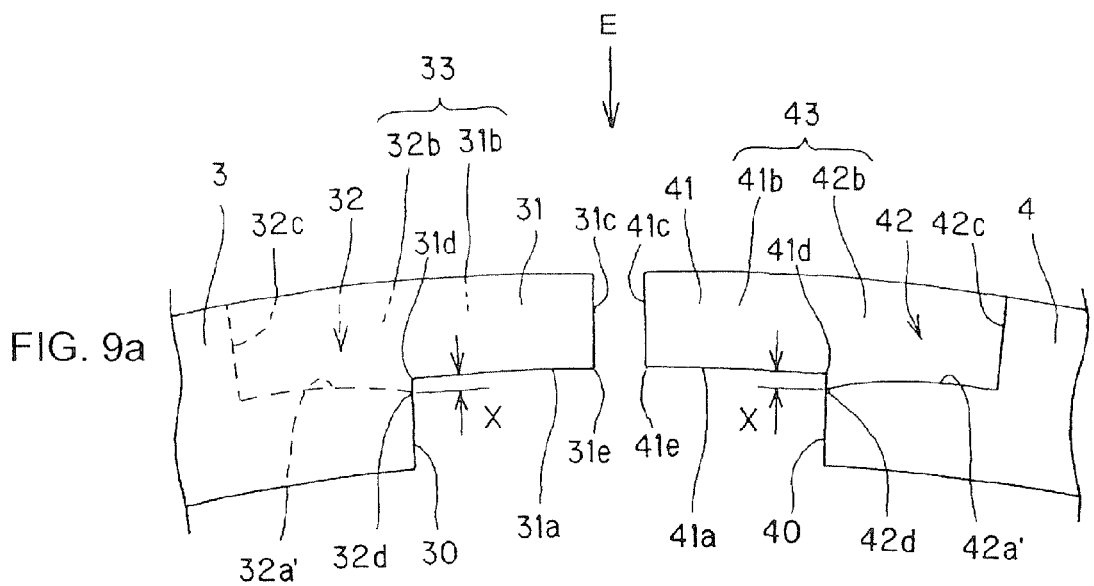
FIG. 9 shows the structure of a separating part of a seal ring according to the second embodiment.
Figure 9B:
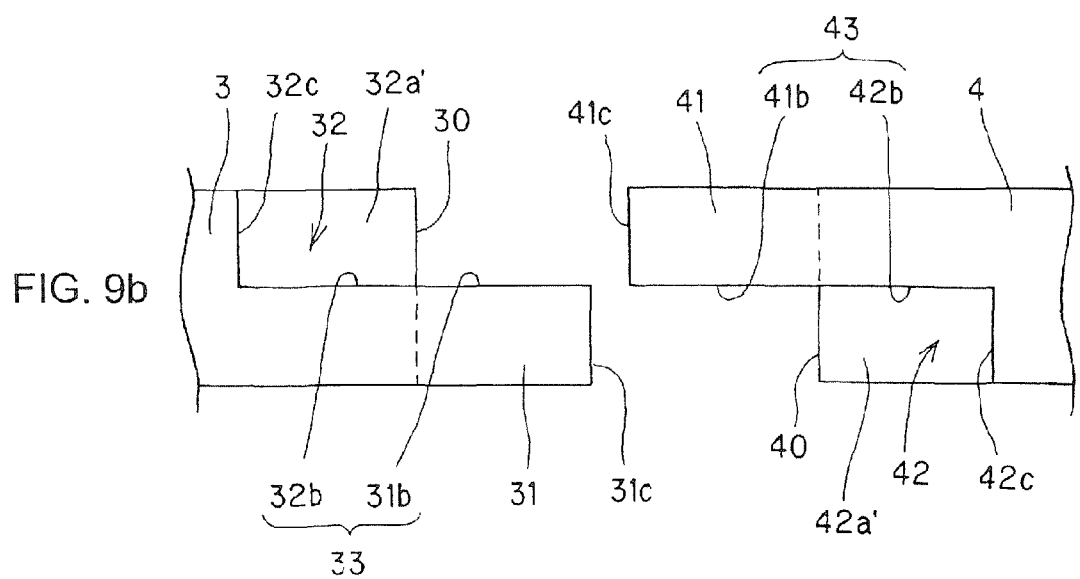

Referring to FIG. 9, next will be described a seal ring according to the second embodiment. FIG. 9 shows a structure of a separating part for the seal ring according to the present embodiment, in which (a) shows it as viewed from the axial direction, and (b) shows it as viewed from arrow E in (b). Here, components identical to those in the first embodiment are labeled with the same reference numbers used in the first embodiment and explanation thereof will not be repeated.

The present embodiment differs from the first embodiment in the following respect: inclining side faces 42a' and 32a' of the second recess 42 and first recess 32 respectively are curved faces, which extend in a curve. That is, in the first embodiment, the inclining side faces 42a and 32a extend straight from the deepest part sides of the second recess 42 and first recess 32 respectively toward their respective open sides. In contrast to this, in the second embodiment, the inclining side faces 42a' and 32a' are curved faces, which extend in a curve so that the inclinations of the faces gradually increase from the deepest part sides of the second recess 42 and first recess 32 respectively toward their respective open sides, as shown in FIG. 9.

In this seal ring 1, when the separating part 2 is stretched or compressed, its curvature changes. Specifically, when the separating part 2 is stretched, the seal ring 1 increases in diameter and hence curvature; and conversely, when it is compressed, the seal ring 1 decreases in diameter and hence curvature. As a result, in the first embodiment, when the curvature of the seal ring 1 increases due to the stretching of the separating part 2, the contact between the edge 31e of the first projection 31 and the inclining side face 42a and the contact between the edge 41e of the second projection 41 and the inclining side face 32a may not be maintained, resulting in separation of the edges 31e and 41e from the inclining side faces 42a and 32a respectively. Specifically, during the compression of the separating part 2 in which the curvature of the seal ring 1 decreases, the contact between the edges 31e and 41e and the inclining side faces 42a and 32a respectively may be maintained by virtue of, for example, pressure, such as oil pressure in the actual use of the seal ring 1, as described above; however, during the stretching of the separating part 2 in which the curvature of the seal ring 1 increases, the contact between the edges 31e and 41e and the inclining side faces 42a and 32a respectively may not be maintained only with pressure such as oil pressure. In this case, gaps may be formed between the edges 31e and 41e and inclining side faces 42a and 32a, resulting in an increase in leakage from the separating part 2.

In the inclining side faces 42a' and 32a' in the second embodiment, similar to the ends 42d and 32d of the inclining side faces 42a and 32a respectively in the first embodiment, the ends 42d and 32d on the second end face 40 side and first end face 30 side respectively are located further on the inside diameter side by X degree than the end 41d on the second end face 40 side of the side face 41a of the second projection 41 and the end 31d of the first end face 30 side of the side face 31a of the first projection 31 respectively. Accordingly, the intermediate portions of the inclining side faces 42a' and 32a' in the second embodiment curve upwards substantially in the direction of the diameter, compared to the inclining side faces 42a and 32a in the first embodiment. That is, the inclining side faces 42a' and 32a' in the second embodiment curve so as to be able to follow the edges 31e and 41e moved away substantially in the direction of the outside diameter as the curvature of the seal ring 1 increases during the stretching of the separating part 2.

Therefore, in the second embodiment, even when the curvature of the seal ring 1 is increased by the stretching of the separating part 2, the contacts between the edges 31e and 41e and the inclining side faces 42a' and 32a' respectively are maintained, thus preventing separation of the edges 31e and 41e from the inclining side faces 42a' and 32a' respectively. This stabilizes the amount of leakage from the separating part 2 and improves the sealability.

In addition, the curvatures of the inclining side faces 42a' and 32a' can be set so that the edges 31e and 41e and the inclining side faces 42a' and 32a' respectively are prevented from pressing each other during the stretching of the separating part 2. For example, it is preferable to set the curvatures so that the inclining side faces 42a' and 32a' curve following the track of the edges 31e and 41e respectively during the stretching of the separating part 2. Such a curved shape makes it possible to maintain the contacts between the edges 31e and 41e and the inclining side faces 42a' and 32a' respectively without increasing slide resistance between the edges 31e and 41e and the inclining side faces 42a' and 32a' respectively. This enables the smooth stretching of the separating part 2 and further improvement in sealability.

What is claimed is:

1. A seal ring for installation into an annular groove formed on a shaft that seals an annular gap between the shaft and a housing that has a shaft hole into which the shaft is inserted, comprising:
    a ring-shaped body having a first end and a second end that are separated from each other by temporarily moving the first end and the second end away from each other during installation of the seal ring into the annular groove, and are attached when the seal ring is installed in the annular groove to thereby seal the annular gap;
    a projection formed on each of the first end and the second end that project in the direction of a circumference of the seal ring, the projections each having an outer surface defining an outermost peripheral surface coincident with an outermost surface of a remainder of said ring-shaped body, and having an inner surface that is concentric with said outer surface so that said projection has a generally equal width in a radial direction throughout its length;
    a recess formed on each of the first end and the second end that cooperates with the projections,
    wherein the projections and the recesses are fitted together while sliding against each other to thereby bring both the first and second ends into contact with each other;
    each of the recesses have a distal end and a proximal end spaced circumferentially from said distal end, the proximal end being located where the recess terminates at a first end that defines a first end face that extends substantially radially inward from the outermost surface of the ring body and the distal end being located where the recess terminates at a second end that defines a second end face that extends substantially radially inward toward an innermost surface of the ring body, and the recess including an inclining side face between the proximal end and the distal end, which continually inclines radially inward from the proximal end to the distal end in a direction of the circumference such that the distal end of the recess is expanded to a greater extent than the proximal end and to a greater extent than the width of the projection;
    the projection and the recess form a sliding part so that a part of an edge of the leading end of the inner surface of the projection slides over the inclining side face of the recess, and a portion of the sliding part is formed as a linear sliding portion; and as the projections are fitted together while sliding against each other, portions of the inner surfaces thereof are always spaced apart from the inclining side faces by a gap.

* * * * *